Patented Feb. 10, 1942

2,272,739

UNITED STATES PATENT OFFICE 2,272,739

FURANE DERIVATIVES OF THE PYRAZOLONE SERIES AND A METHOD OF MAKING THE SAME

Max Dohrn, Berlin-Charlottenburg, and Kurt Hamann, Berlin, Germany, assignors to Schering Corporation, Bloomfield, N. J., a corporation of New Jersey No Drawing. Application May 3, 1939, Serial No. 271,606. In Germany May 10, 1938

10 Claims. (Cl. 260—310)

This invention relates to furane derivatives of the pyrazolone series and a process of making the same.

It is known that by condensation of acetoacetic ester with symmetrical alkyl-phenylhydrazines, or with phenyl-hydrazines and subsequent alkylation, pyrazolone derivatives are obtained which are used as antipyretics in therapy.

In accordance with the present invention particularly active compounds of this series are obtained when furfuryl-acyl-acetic acid derivatives which are suitable for forming with phenylhydrazine a pyrazolone ring, are condensed with phenyl-hydrazines to pyrazolone derivatives. For the manufacture of these compounds one proceeds in the manner known per se, such that for example furfuryl-acyl-acetic esters such as furfuryl-aceto-acetic ester or furfuryl-benzoylacetic ester are condensed with phenyl hydrazines symmetrically substituted by an alkyl residue such as symmetrical methyl or ethyl phenyl hydrazine, or such that first furfuryl-acyl-acetic esters are condensed with phenyl-hydrazine and the pyrazolone compound obtained thereupon alkylated.

Instead of the acyl-acetic esters also the corresponding amides, anilides or similar compounds of the free acyl-acetic acids can be employed in so far as they are capable of easily again forming the acyl-acetic acid.

Phenyl-hydrazines can also be subjected to the condensation which are substituted in the phenyl residue for example by halogen, nitro, amino, hydroxyl, sulpho, carboxyl or the like groups, hydrocarbon residues or other substituents.

The invention is illustrated by the following examples:

Example 1

1-phenyl-2,3-dimethyl-4-furfuryl-pyrazolon-5. 21 grams of 2-(α-furfuryl)-aceto-acetic ester (produced by reduction of furfurylidene-acetoacetic ester by means of sodium amalgam in alcoholic solution or also by catalytic method, B. P. 110–112° C. under 4 mm. pressure) having the following structural formula:

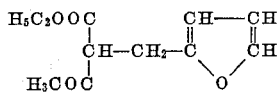

are heated on the boiling water bath with 10.8 grams of phenyl hydrazine and a few drops of absolute alcohol. After a short time commences the separation of water droplets and after 2 hours the reaction product crystallises on rubbing with ether. The condensation product thus obtained melts after recrystallisation from alcohol at 131–133° C. The reaction is in accordance with the following equation:

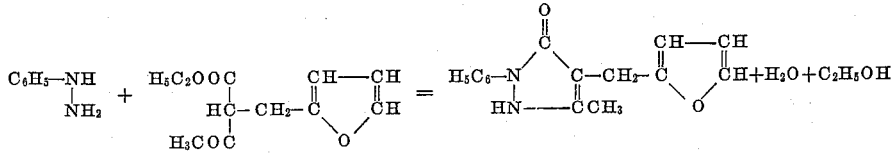

the product being 1-phenyl-3-methyl-4-furfurylpyrazolone-5.

25.4 grams of this furfuryl-pyrazolone are dissolved in a 20% caustic potash lye which contains 11.2 grams of potassium hydroxide. Thereto are added with stirring and ice cooling 15.8 grams of dimethyl sulphate. After a short time commences the separation of an oil which on long standing gradually solidifies and then melts at 89° C.

Example 2

1-phenyl-2,3-dimethyl-4-furfuryl-pyrazolon-5. 11 grams of phenyl-methyl-hydrazine and 21 grams of α-furfuryl-aceto-acetic ester are stirred with 5 ccs. of alcohol first for 2 hours at 80° C. and then for a further 2 hours to 150° C. The crude product is taken up with benzene, washed with water and after drying and evaporation of the solvent distilled in the vacuum of the oil pump. There is thus obtained directly pure 1-phenyl-2,3-dimethyl-4-furfuryl-5-pyrazolone of M. P. 89–91° C.

Example 3

1-phenyl-3-methyl-4-furfuryl-pyrazolone-5. 80 grams of aniline and 20 grams of α-furfurylaceto-acetic ester are heated for 3 hours to 170° C. The oil separated from diphenyl-urea is ground with alcohol and yields after standing overnight 5.5 grams of α-furfuryl-aceto-acetic acid anilide which after recrystallisation from ethyl acetate and ligroin (1:2) gives prismatic needles of M. P. 118–121° C.

Equi-molecular quantities of the anilide and phenyl-hydrazine are heated with some alcohol for 5 hours to 170° C. The reaction product is distilled in high vacuum. A portion solidifies to pure 1-phenyl-3-methyl-4-furfuryl-pyrazolone-5.

Example 4

1-tolyl-2,3-dimethyl-4-furfuryl-pyrazolone-5. 43 grams of furfuryl-aceto-acetic ester and 25 grams of p-tolyl-hydrazine are dissolved in 50 ccs. of alcohol with 50 ccs. of benzene with cooling, then heated under reflux for 2 hours, the remaining oil treated with ether and some methanol and left to slow crystallisation. The deposited crystals are washed with ether and recrystallised from ligroin-alcohol (3:1). M. P. 118–120° C.

15.4 grams of caustic potash are dissolved in 150 ccs. of water, 36.8 grams of finely powdered 1-p-tolyl-3-methyl-4-furfuryl-pyrazolone-(5) introduced, which rapidly passes into solution, and then with stirring and cooling with ice water 21 grams of dimethyl sulphate introduced. The reaction mixture is stirred for a further 30 minutes at 80° C., taken up with benzene and washed with alkali and water. The benzene residue crystallises on rubbing with ether. Recrystallised from ligroin colourless needles and leaflets are obtained of M. P. 90–92° C.

*Example 5*

1-(p-nitro-phenyl)-2,3-dimethyl-4-furfuryl-pyrazolone-5. 21 grams of α-furfuryl-aceto-acetic ester and 15 grams of p-nitrophenyl-hydrazine are heated for 2 hours under reflux in 100 ccs. of toluene. The solvent is distilled off in vacuum, the residue rubbed with methanol and cooled to 0° C. The separated crystals are recrystallised from methanol with animal charcoal. Golden yellow leaflets of M. P. 169–170° C. are obtained.

Methylation: 6.5 grams of the above described pyrazolons are dissolved in 75 ccs. of acetone with the addition of 1.35 grams of finely powdered caustic potash, then the whole heated under reflux for 5 minutes, 3 grams of dimethyl sulphate introduced, whereby the colour changes from deep violet to light brown, the whole again heated under reflux for 5 minutes and poured into water. Part of the substance solidifies. The yellow crude product is recrystallised from methanol with some animal charcoal. Light yellow crystal needles are obtained of M. P. 74–76° C.

For conversion of the 1-(p-nitro-phenyl)-3-methyl-4-furfuryl-pyrazolone-5 into 1-(p-amino-phenyl)-3-methyl-4-furfuryl-pyrazolone-5 17.7 grams are dissolved in 10% caustic soda lye and treated with hydrosulphite solution to complete decolorisation. The light yellow precipitate which has deposited over night is recrystallised from alcohol; the yellow powder becomes above 150° C. slowly darker, at 200° C. black and at 260° C. distinctly plastic. The final product has the following structural formula:

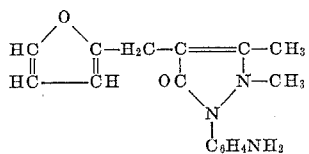

No sharp melting point was observed.

*Example 6*

1-(p-bromophenyl)-2,3-dimethyl-4-furfuryl-pyrazolone-5. 12.5 grams of α-furfuryl-aceto-acetic ester and 10 grams of p-bromophenyl-hydrazine are treated with 10 ccs. of alcohol and heated for 3 hours on the water bath. The mass which on cooling has solidified to crystals becomes on washing with ether pure white and yields after recrystallisation from alcohol colourless four sided flat prisms, M. P. 170–172° C.

6.6 grams of the 1-(p-bromo-phenyl)-3-methyl-4-furfuryl-pyrazolone thus obtained are shaken in 25 ccs. of acetone with the addition of 1.12 grams of finely powdered caustic potash to solution, treated with 2.8 grams of dimethyl sulphate and heated for 5 minutes under reflux. Working up is effected as above. From ligroin-ether crystallises the 1-(p-bromo-phenyl)-2,3-dimethyl-4-furfuryl-pyrazolone-5 in colourless leaflets to M. P. 103–105° C.

*Example 7*

1-(p-sulphophenyl)-3-methyl-4-furfuryl-pyrazolone-5. 38 grams of phenyl-hydrazine-4-sulphonic acid are exactly neutralised with sodium carbonate solution, the solution made up to 300 ccs. and 42 grams of α-furfuryl-aceto-acetic ester introduced and the mixture stirred for 2 hours at 60° C., then cooled, rendered acid to Congo red with hydrochloric acid and the aqueous liquid decanted from the separated oil. The oil is washed several times with water and solidifies, after grinding and cooling to a brown powder which can be recrystallised from hot water. The substance exhibits no melting point.

*Example 8*

1-(p-acetamido-phenyl)-3-methyl-4-furfuryl-pyrazolone-5. 10 grams of p-acetaminophenyl-hydrazine hydrochloride are stirred over night with 8 ccs. of α-furfuryl-aceto-acetic ester in 100 ccs. of water and with the addition of 1 cc. of concentrated sulphuric acid. Next morning an oil has separated which is taken up in methanol and precipitated in stages with ether. The second fraction partly crystallises; the separated white powder is recrystallised from alcohol and in this manner obtained in small white star-shaped crystals of M. P. 244–246° C.

*Example 9*

1,3-diphenyl-4-furfuryl-pyrazolone-5. 13.6 grams of α-furfuryl-benzoyl-acetic ester (obtained by reduction of α-furfurylidene-benzoyl-acetic ester; B. P. under 3 mm. 168 to 172° C.), and 5.4 grams of phenyl-hydrazine are heated with 4 ccs. of alcohol for 2 hours to 80° C., ground with ether and the separated crystal paste recrystallised from alcohol. Prismatic needles of M. P. 136–138° C.

The reaction which takes place may be indicated by the following equation:

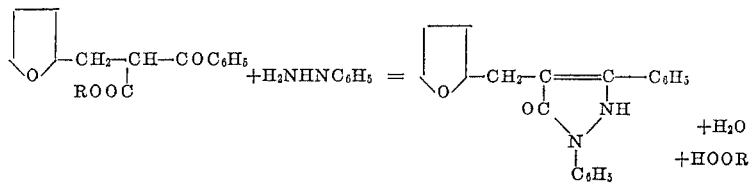

*Example 10*

1-(p-tolyl)-3-phenyl-4-furfuryl-pyrazolone-5. 27 grams of α-furfuryl-benzoyl-acetic ester and 12 grams of p-tolyl-hydrazine are heated with 30 ccs. of benzene for 2 hours at 80° C. From the black product after grinding with ether crystals are obtained which after recrystallisation several times from alcohol give colourless needles of M. P. 135–137° C.

*Example 11*

1-(p-nitrophenyl)-3-phenyl-4-furfuryl-pyrazolone-5. 9.2 grams of p-nitrophenyl-hydrazine and 16.1 grams of α-furfuryl-benzoyl-acetic ester are heated in 100 ccs. of toluene for 2 hours on the water bath. The solvent is evaporated, ground with ether and after long standing at low temperature a discoloured crude product obtained which after recrystallisation several times from alcohol gives light yellow crystals of M. P. 203–205° C.

*Example 12*

1-(p-bromophenyl)-2,3-dimethyl-4-furfuryl-pyrazolone-5. 9 grams of α-furfuryl-aceto acetic ester and 6 grams of p-bromophenyl-hydrazine are heated on the water bath for 2 hours in 30 ccs. of toluene. Working up is effected as above. From alcohol with animal charcoal then crystallises in large colourless leaflets of M. P. 173.5–175° C. the 1-(p-bromo-phenyl-3-methyl-4-furfuryl-pyrazolone-5. 2.7 grams of this pyrazolone, 1.2 grams of methyl iodide and 5 ccs. of methanol are heated in a bomb tube for 6 hours to 100° C., the resulting oil distilled under 3 mm. pressure and thus directly colourless crystals of M. P. 191–193° C. obtained.

*Example 13*

1-phenyl-2-methyl-3-(α-furyl)-4-furfuryl-pyrazolone-5. 60.8 grams of furyl-acetic acid ethylester (B. P. under 14 mm. 145–147° C.) are heated for 24 hours under reflux to 155–160° C. with equivalent quantities of furfurol (32.1 grams) and acetic anhydride (34 grams). After distilling off the undecomposed portions there distils as main product the α-furfurylidene-furyl-acetic ester as a thick yellow oil of B. P. 206–214° C. under 6 mm. pressure. 35 grams of this ester are dissolved in 100 ccs. of methanol pro analysi and hydrogenated with Raney nickel as catalyst. After taking up 3.3 litres of hydrogen at 22° C. and 763 mm. (calculated 3.2 litres) the hydrogenation was interrupted and the reaction product distilled. 21 grams are obtained of α-furfuryl-furyl-aceto-acetic ethyl ester as practically colourless oil of B. P. 196–202° C. under 15 mm. pressure. The residue remains as a non-distilling resin.

13.5 grams of α-furfuryl-furyl-aceto-acetic acid ethyl ester are heated with 5.6 grams of phenyl-hydrazine and 10 ccs. of alcohol for 1 hour on the water bath under reflux, then the alcohol evaporated and the oily residue heated in the oil bath to 140° C. The splitting off of alcohol which immediately sets in is complete after 20 minutes. The oily reaction product is taken up in benzene, shaken with 5% caustic soda solution and the alkaline liquid rendered weakly acid with acetic acid. The precipitated light brown substance is dissolved in benzene, dried with sodium sulphate and the glass-like benzene residue (M. P. 103–112° C.) methylated without further purification as follows: the substance (4.5 grams) is dissolved in 10 ccs. of methanol, the solution of 1.7 grams of caustic potash in 10 ccs. of water added and then the whole treated drop by drop with 2.2 grams of dimethyl sulphate. The separated oil is dissolved in benzene, dried with sodium sulphate and the oily benzene residue distilled. A colourless oil passes over under 8 mm. at 265–271° C. which spontaneously crystallises and is deposited from alcohol in needles of M. P. 144° C. By saturation of the benzene solution with hydrogen chloride the hydrochloride is obtained. The final product has the following structural formula:

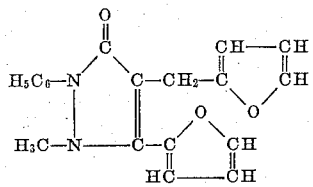

*Example 14*

1-(4'-ethoxy-phenyl)-2,3-dimethyl-4-furfuryl-pyrazolone-(5). 45.5 grams of 4-ethoxy-phenyl-hydrazine are heated under reflux on the steam bath for 1 hour with 63 grams of α-furfuryl-aceto-acetic ester and 150 ccs. of alcohol, the alcohol distilled off and the oily residue heated for 20 minutes to 140° C. The reaction product taken up in benzene is extracted with 5% caustic soda lye and this acidified with acetic acid. The precipitated pyrazolone was recrystallised from ethyl acetate-benzene (1:1). Colourless prisms of M. P. 102–104° C.

26 grams of the 1-(4'-ethoxy-phenyl)-3-methyl-4-furfuryl-pyrazolone-(5) thus obtained are dissolved in 100 ccs. of 10% caustic potash lye, 13.3 grams of dimethyl sulphate introduced drop by drop with stirring and cooling, the whole stirred for 30 minutes at room temperature and a further 30 minutes at 80° C. and worked up as above. The crude product is distilled. At 240–246° C. under 1.5 mm. a colourless oil passes over which rapidly crystallises. From ligroin needles are obtained of M. P. 91–93° C.

*Example 15*

1-cyclohexyl-2,3-dimethyl-4-furfuryl-pyrazolone-(5). To 25.5 grams of cyclohexyl-hydrazine dissolved in 20 ccs. of water is added drop by drop a mixture of 65 ccs. of concentrated hydrochloric acid and 40 ccs. of water. Into the briskly stirred solution are dropped 47 grams of α-furfuryl-aceto-acetic ester, after 45 minutes 31 grams of sodium acetate introduced (reaction becomes acid to litmus) and the whole is stirred for 1 hour longer at 70° C. After standing overnight the whole is exactly neutralised, extracted with benzene and the benzene residue distilled. There is obtained a fraction boiling under 1.5 mm. at 170–190° C., which crystallises. From a little alcohol prisms are obtained of M. P. 142° C.

18 grams of the 1-cyclohexyl-3-methyl-4-furfuryl-pyrazolone-(5) thus obtained are dissolved in 80 ccs. of 10% caustic potash solution and methylated as above described with 10.4 grams of dimethyl sulphate. The reaction product insoluble in alkali is distilled. At 174–186° C. under 1.5 mm. an oil distils which after strong cooling solidifies to colourless prisms of M. P. 45–48° C. The products of the present invention may be characterized by the following general structural formula:

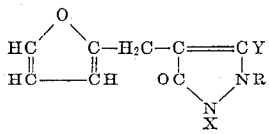

wherein X is an aromatic radical, Y is a radical taken from the class consisting of aliphatic, aromatic and heterocyclic radicals, and R is an alkyl radical.

Having now particularly described and ascertained the nature of our said invention and in what manner the same is to be performed, we declare that what we claim is:

1. Process for the manufacture of furane derivatives of the pyrazolone series, wherein furfuryl-acyl-acetic acid compounds having the following general formula

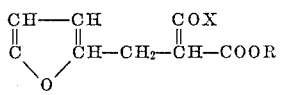

wherein R is a member of the class consisting of hydrogen and hydro-carbon radicals and COX is an acyl group, are condensed with phenyl-hydrazines, whereby said acyl-acetic and hydrazine groups form a pyrazolone ring.

2. Process as claimed in claim 1, in which α furfuryl-aceto-acetic esters, are employed for condensation.

3. Process as claimed in claim 1, in which α furfuryl-aceto-acetic ester is condensed with phenyl-hydrazine and the pyrazolone derivative obtained methylated by means of dimethyl sulphate in alkaline solution.

4. Furane derivatives of the pyrazolone series having the following structural formula:

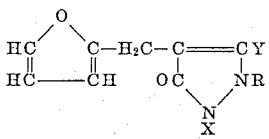

wherein X is an aromatic radical, Y is a radical taken from the class consisting of aliphatic, aromatic and heterocyclic radicals and R is an alkyl radical.

5. 1-phenyl-3-methyl-4-furfuryl-pyrazolone-5 having the following structural formula:

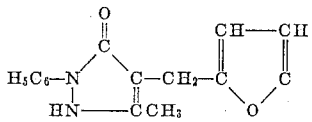

6. 1-phenyl-2-methyl-3(α-furyl)-4-furfuryl-pyrazolone-5 having the following structural formula:

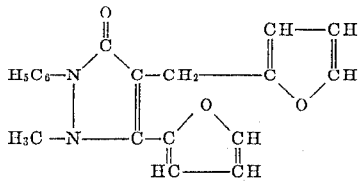

7. 1-(p-aminophenyl)-2,3 dimethyl-4-furfuryl-pyrazolone-5 having the following structural formula:

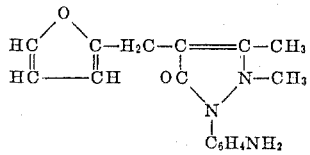

8. Furane derivatives of the pyrazolone series having the following structural formula:

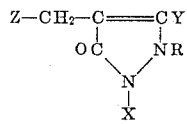

in which R is hydrogen or an alkyl group, X is an aromatic group, Y is an alkyl group, and Z is a furane group wherein a carbon atom of the furane ring is directly linked to aforesaid —CH$_2$-group.

9. Process for the manufacture of furane derivatives of the pyrazolone series, wherein furfuryl-acyl-acetic acid compounds having the following general formula

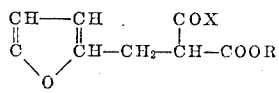

wherein R is a member of the class consisting of hydrogen and hydro-carbon radicals and COX is an acyl group, are condensed with phenyl-hydrazines, whereby said acyl-acetic and hydrazine groups form a pyrazolone ring, and the condensation product so formed is alkylated.

10. Process according to claim 1 wherein the OR radical is replaced by an amide forming radical.

MAX DOHRN.
KURT HAMANN.